United States Patent [19]

Sato et al.

[11] Patent Number: 4,678,830
[45] Date of Patent: Jul. 7, 1987

[54] TIRE TREAD RUBBER COMPOSITION

[75] Inventors: Susumu Sato, Tokyo; Keizo Okamoto, Higashikurume, both of Japan

[73] Assignee: Bridgestone Corporation, Tokyo, Japan

[21] Appl. No.: 826,059

[22] Filed: Feb. 4, 1986

[30] Foreign Application Priority Data

Apr. 5, 1985 [JP] Japan .................................. 60-71066

[51] Int. Cl.$^4$ ......................... C08L 7/00; C08L 9/00; C08K 3/04
[52] U.S. Cl. .................................... 524/495; 524/526; 524/571
[58] Field of Search .................. 524/495, 571, 526

[56] References Cited

U.S. PATENT DOCUMENTS

| | | | |
|---|---|---|---|
| 4,071,496 | 1/1978 | Kraus et al. | 524/495 |
| 4,477,621 | 10/1984 | Sato et al. | 524/495 |
| 4,548,980 | 10/1985 | Nagata et al. | 524/495 |
| 4,550,135 | 10/1985 | Iwama et al. | 524/495 |

Primary Examiner—Allan M. Lieberman
Attorney, Agent, or Firm—Sughrue, Mion, Zinn, Macpeak & Seas

[57] ABSTRACT

A rubber composition composed of natural rubber alone or a blend rubber consisting of natural rubber and not more than 50% by weight of at least one kind of a diene base synthetic rubber, and containing carbon black satisfying the following relations in an amount from 35 to 55 parts by weight with respect to 100 parts of the rubber component:

(a) Nitrogen adsorption specific surface area ($N_2SA$) is from 115 to 135 m$^2$/g.
(b) The strength ($\Delta DBP$) of the agglomerates defined by the following formula is not more than 18 ml/100 g.

$$\Delta DBP(\text{ml}/100 \text{ g}) = DBP - 24M4DBP$$

(c) An oil adsorption at 24M4DBP is from 95 to 110 ml/100 g.
(d) A ratio of the nitrogen adsorbing specific surface area ($N_2SA$) (m$^2$/g) to iodine adsorbing specific surface area (IA) (mg/g) is from 1.05 to 1.20.

1 Claim, 1 Drawing Figure

TIRE TREAD RUBBER COMPOSITION

BACKGROUND OF THE INVENTION

1. Field of the Invention

The present invention relates to a tire tread rubber composition with excellent wear resistance and low fuel consumption.

2. Related Art Statement

In order to assure fuel saving of a tread rubber of tires, particularly tires for use in large scaled vehicles, the following measures have been heretofore adopted:

(a) Styrene butadiene rubber (SBR) is inappropriate, and natural rubber (NR) and butadiene rubber (BR) are most suitable. Therefore, the latter rubbers are used.

(b) Carbon black is replaced by low reinforcing carbon black.

(c) A compounding addition amount of carbon black is reduced.

On the other hand, in order to improve the wear resistance, the following measures have been adopted.

(a') The compounding amount of the carbon black is increased.

(b') Carbon black is replaced by high reinforcing carbon black with a high specific surface area.

(c') NR and BR are used as rubber component.

However, the wear resistance is deteriorated by adopting the above fuel saving-assuring measures (a) and (b). On the other hand, by using too much BR in the rubber components in the wear resistance-improving measures, the wear resistance is also lowered. Therefore, it is necessary to use natural rubber in an amount of not less than 50% by weight. Further, the fuel saving-assuring is deteriorated in the case of the counter-measures (a') and (b'). As mentioned above, the fuel saving-assuring measures and the wear resistance-increasing measures exhibit the opposed tendencies in the conventional techniques, and it has been impossible to attain both characteristics. Thus, it has a long felt desire to develop the tread rubber compositions suitable for tire tread rubber with both the performances, particularly the tread rubber of pneumatic tires for use in large scaled vehicles such as trucks, buses, etc.

SUMMARY OF THE INVENTION

It is an object of the present invention to provide a tire tread rubber composition with excellent wear resistance and low fuel consumption.

According to the present invention, the rubber component used is optimized, that is, NR alone or a blend rubber in which NR and not more than 50% by weight of at least one kind of a diene base synthetic rubber are blended is used. Namely, the characteristics of carbon black are reviewed to be improved, i.e., to improve the heat generating property thereof. The strength of agglomerates is increased to apply shearing forces upon carbon black during kneading. Thereby, the dispersing degree of carbon black in the rubber is remarkably increased, and the heat generating property tan $\delta$ is lowered. Further, when the hardness of the rubber is too high, the fatigue resistance of the rubber is lowered, and the appearance of the tire becomes deteriorated, while when the hardness of the rubber becomes lower, the wear resistance at the high input is lowered. In view of the above, the present invention provides both wear resistance and low fuel consumption in a rubber composition for tire tread by optimizing the hardness of the rubber.

The rubber composition attained in such a manner is characterized in that with respect to 100 parts of natural rubber alone or a blend rubber in which natural rubber and not more than 50% by weight of at least one kind of a diene base synthetic rubber are blended, carbon black satisfying the following relations is blended in an amount from 35 to 55 parts by weight:

(A) Nitrogen adsorption specific surface area ($N_2SA$) is from 115 to 135 $m^2/g$.

(B) The strength ($\Delta DBP$) of the agglomerates defined by the following formula is not more than 18 ml/100 g.

$$\Delta DBP(\text{ml}/100\text{ g}) = DBP - 24M4DBP$$

(C) An oil absorption at 24M4DBP is from 95 to 110 ml/100 g.

(D) A ratio of the nitrogen adsorbing specific surface area ($N_2SA$) ($m^2/g$) to iodine adsorbing specific surface area (IA) (mg/g) is from 1.05 to 1.20.

These and other objects, features and advantages of the present invention will be well appreciated upon reading of the following description of the invention when taken in conjunction with the attached drawings with understanding that some modifications, variations and changes could be easily done by the skilled in the art to which the invention pertains without departing from the spirit of the invention or the scope of claims appended thereto.

BRIEF DESCRIPTION OF THE DRAWING

For better understanding of the invention, reference is made to the attached drawings, wherein.

Figure 1:
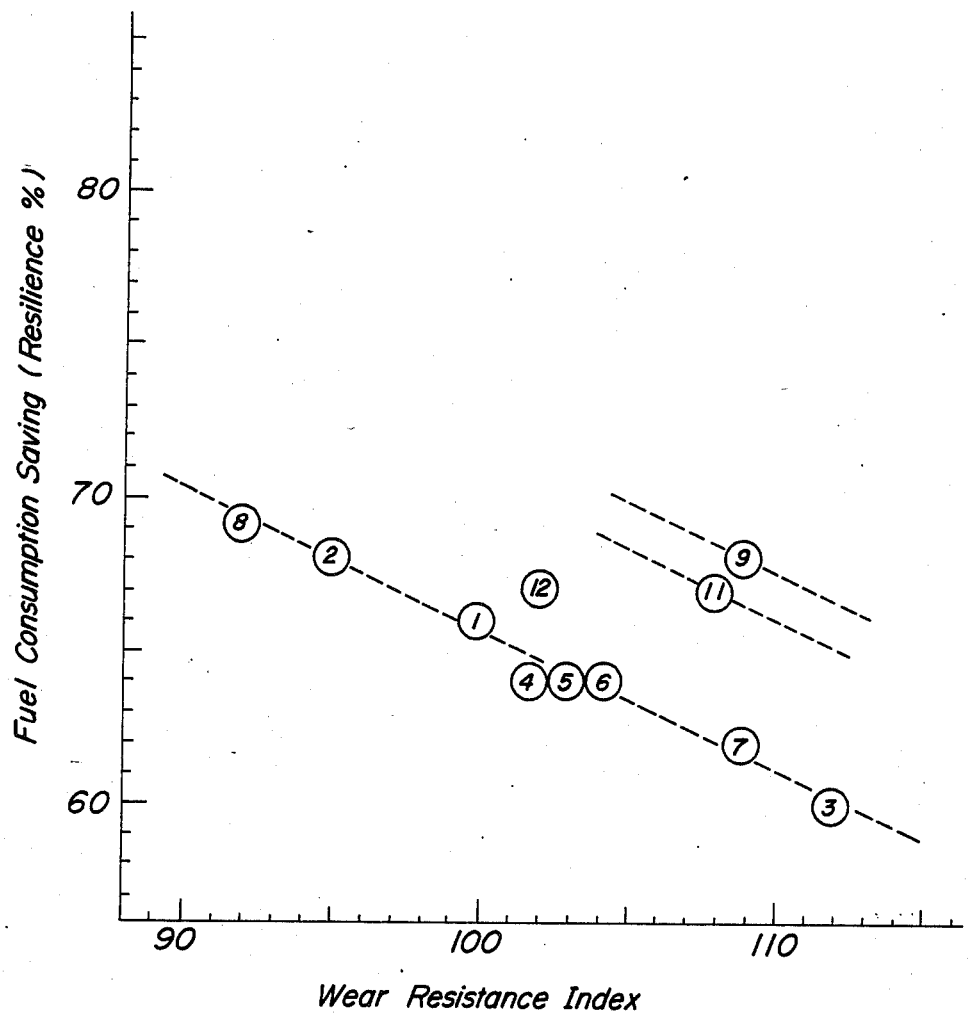
FIG. 1 is a graph showing the relation between wear resistance and fuel saving with respect to rubber compositions of Examples according to the present invention and Comparative examples.

The rubber used in the rubber composition according to the present invention, use may be made of natural rubber alone or a blend rubber consisting natural rubber and at least one kind of a diene base synthetic rubber. The diene base synthetic rubber may include butadiene rubber (BR), styrene-butadiene rubber (SBR), polyisoprene rubber (IR), butyl rubber (IIR), halogenated butyl rubber, acrylonitrile butadiene rubber (NBR), ethylene-propylene-diene terpolymer rubber (EPDM) and so on. The compounding amount of the synthetic rubber in the use of the blend rubber is not more than 50% by weight since if the compounding amount is more than 50% by weight, the wear resistance is lowered.

The carbon black used is required to satisfy the following conditions (A) to (D).

(A) Nitrogen adsorption specific surface area ($N_2SA$) is from 115 to 135 $m^2/g$.

(B) The strength ($\Delta DBP$) of the agglomerates defined by the following formula is not more than 18 ml/100 g.

$$\Delta DBP(\text{ml}/100\text{ g}) = DBP - 24M4DBP$$

(C) An oil absorption at 24M4DBP is from 95 to 110 ml/100 g.

(D) A ratio of the nitrogen adsorbing specific surface area ($N_2SA$) ($m^2/g$) to the iodine adsorbing specific surface area (IA) (mg/g) is from 1.05 to 1.20.

If the nitrogen absorbing specific surface area ($N_2SA$) in the above condition (A) is less than 115 $m^2/g$, the wear resistance is lowered. If it is over 135 m²/g, the degree of dispersion of the carbon black is lowered. Thus, the nitrogen adsorbing specific surface area (N₂SA) is from 115 to 135 m²/g.

The reason why the strength (ΔDBP) of the agglomerates body in the condition (B) is not more than 18 ml/100 g is that 24M4DBP is a DBP (dibutylphthalate) oil absorbing amount after a carbon black high dimension structure is fractured under a specific pressure when the number of fracturing under ASTMD 3493 is set at four; if the strength (ΔDBP) of the agglomerates is larger than 18 ml/100 g, the resilience can not be made larger and the fuel saving is deteriorated; further, the structural fracture proceeds during the kneading; the dispersibility of the carbon black in the compounded rubber is lowered; and the fuel saving is deteriorated due to increase in the loss energy based on the slipping between large carbon black particles in the agglomerate mass because of the poor dispersion in the vulcanized rubber composition.

Next, the reason why the 24M4DBP is set at from 95 to 110 ml/100 g is that if it is less than 95 ml/100 g, the shearing force upon the carbon black during kneading is lowered to reduce the dispersibility of the carbon in the compounded rubber. The vulcanized rubber composition increases the loss energy due to the slipping between carbon black particles in the large carbon black agglomerate masses because of poor dispersion in the vulcanized rubber composition, thereby lowering the fuel saving. It is over 110 ml/100 g on the other hand, the elasticity of the compounded rubber increases and the pitching resistance of the tread is lowered.

Further, the reason why the ratio of the nitrogen adsorbing specific surface area (N₂SA) (m²/g)/iodine adsorbing specific surface area (IA) (mg/g) is set at from 1.05 to 1.20 is that if it is less than 1.05, the surface activity of the carbon black is lowered; the gel amount of the carbon black and the rubber (polymer) becomes insufficient; the reinforcing property including the wear resistance is lowered, while on the other hand, if it is over 1.20, the gelling reaction between carbon black and the polymer proceeds during the initial stage of the kneading to lower the dispersibility as well as the wear resistance.

That is, the ionic adsorption participates in the iodine adsorbing specific surface area (IA). Surface stains are conspicuous in the case of the carbon black with a low iodine adsorption specific surface area. This means that a residue of a raw oil remains on the surfaces of the carbon black and oil as non-ionic oil lowers the value of the iodine adsorbing specific surface area.

On the other hand, the carbon black having undergone the excess oxidation possesses the active functional groups of

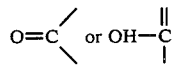

on the surface thereof.

However, if the ratio of N₂SA/IA is less than 1.05, the activity of the surface of the carbon black becomes too low due to the residual oil thereon, thereby resulting in the insufficient amount of gel mainly containing a reaction product between carbon black and the polymer. The gel amount influences the reinforcing layer of the polymer and carbon black. The increase in the gel amount improves the wear resistance when included in the rubber composition of the tire tread. On the other hand, insufficient gel amount lowers the wear resistance. If the ratio of N₂SA/IA exceeds 1.20, the surface activity of carbon black becomes so high that the carbon black proceeds to the gelation reaction with the polymer in the state of huge agglomerate masses during the initial kneading stage in which carbon black is not dispersed into the rubber. As a result, the reinforcing layer of the polymer and the carbon black is formed in a low dispersed state to lower the wear resistance.

The carbon black satisfying the above-mentioned conditions (A) to (D) is compounded in an amount of 35 to 55 parts by weight with respect to 100 parts by weight of the rubber component. The reason therefor is that if the amount is less than 35 parts by weight, the effect of the carbon black is not fully exhibited to make the wear resistance insufficient, while if it is over 55 parts by weight, the loss energy due to the carbon black increases to make the fuel saving insufficient.

Although the hardness (Hd) of the rubber is governed by the number of the compounding parts of the carbon black, it is an important criterion commonly used for the judgement of the performance of the tread rubber. It is preferable that the rubber hardness is set at a range of 55 to 67 considering all the compounding factors such as the kind of the polymer and the density of the cross linking. If the hardness is less than 55, the wear resistance becomes deficient, while if it is more than 67, the fuel saving is insufficient to lower the appearance of the tire.

To the rubber composition to the present invention are appropriately added compounding agents other than the above, for instance, vulcanizer, vulcanization accelerator, process oil, anti-aging agent, anti-oxidant filler and so on in amounts commonly used.

The present invention will be explained more in detail with respect to the following Examples which are merely given to illustrate the invention but never intended to limit the scope of the invention.

EXAMPLES

Fourteen kinds of rubber compositions of Examples, Comparative prior art and Comparative examples were prepared as shown in Table 1 (the compounding amount being represented by "parts by weight").

Tires (TBR)1000R-20 14PR R 220 for use in the truck and buses were prepared by using these rubber compositions. After each tire was subjected to a running test on an actual car for about 30,000 km, a distance which allowed running during which a groove depth is decreased by 1 mm from the depth of an original grooves of a pattern of a tread rubber was calculated (running distance/mm), and figures obtained by dividing the calculated distance by a reciprocal of a figure of Sample No. 1 as a prior art (Control) in Table 1 and by multiplying the quotient with 100. These figures are also shown in Table 1 as evaluation value.

The characteristics of the carbon black and the rubber composition were evaluated by the following evaluation ways, and are shown in Table 1. Evaluation ways:

| | |
|---|---|
| Nitrogen adsorbing specific surface area (N₂SA) (m²/g) | ASTM D-3037 |
| 24M4DBP oil absorption | ASTM D-3493 |
| DBP oil absorption | JIS K-6221 |
| Iodine adsorbing specific | JIS K-6221 |

| -continued | |
|---|---|
| surface area (IA) Rubber hardness | JIS K-6301 |
| Resilience | British standard BS: 903:1950 Section 22-3 |

The measure of the resilience was used instead of the measure for the fuel saving. The larger the resilience, the higher the fuel saving.

level of the resilience as index representing the fuel saving while highly maintaining the wear resistance with respect to Prior art Examples, Comparative examples 1-8, 12 to 14.

In Table 1, the evaluating measurement of the wear resistance was impossible in Sample No. 10 because many pitchings were observed in the tread. Since Sample No. 13 was judged to be at an extremely low level from results of room wear evaluation test, no actual car test was not performed because the actual car wearing

TABLE 1

| | | Sample No. | | | | | | |
|---|---|---|---|---|---|---|---|---|
| | | 1 Prior art | 2 Comparative example | 3 Comparative example | 4 Comparative example | 5 Comparative example | 6 Comparative example | 7 Comparative example |
| NR | | 100 | 100 | 100 | 100 | 100 | 100 | 100 |
| BR 01 | | — | — | — | — | — | — | — |
| Carbon black | | 45*1 | 45*2 | 45*3 | 45*4 | 45 | 45 | 45 |
| Stearic acid | | 3 | 3 | 3 | 3 | 3 | 3 | 3 |
| Anti-oxidant 4010NA | | 2 | 2 | 2 | 2 | 2 | 2 | 2 |
| ZnO | | 5 | 5 | 5 | 5 | 5 | 5 | 5 |
| Vulcanization accelerator CZ | | 0.6 | 0.6 | 0.6 | 0.6 | 0.6 | 0.6 | 0.6 |
| Sulfur | | 2 | 2 | 2 | 2 | 2 | 2 | 2 |
| Characteristics in carbon black | $N_2SA$ (m$^2$/g) | 119 | 108 | 143 | 125 | 125 | 126 | 143 |
| | IA (mg/g) | 121 | 108 | 145 | 123 | 115 | 115 | 132 |
| | $N_2SA$/IA ratio | 0.98 | 1.00 | 0.99 | 1.02 | 1.09 | 1.10 | 1.08 |
| | DBP (ml/100 g) | 114 | 124 | 113 | 126 | 125 | 108 | 119 |
| | 24M4DBP (ml/100 g) | 100 | 105 | 98 | 106 | 106 | 94 | 105 |
| | ΔDBP | 14 | 19 | 15 | 20 | 19 | 14 | 14 |
| Characteristics in rubber | Hardness Hd | 62 | 61 | 63 | 62 | 63 | 63 | 65 |
| | Resilience (%) | 66 | 68 | 60 | 64 | 64 | 64 | 62 |
| | Wear resilience | 100 | 95 | 112 | 102 | 103 | 104 | 109 |

| | | Sample No. | | | | | | |
|---|---|---|---|---|---|---|---|---|
| | | 8 Comparative example | 9 Example | 10 Comparative example | 11 Example | 12 Comparative example | 13 Comparative example | 14 Comparative example |
| NR | | 100 | 100 | 100 | 60 | 40 | 100 | 100 |
| BR 01 | | — | — | — | 40 | 60 | — | — |
| Carbon black | | 45 | 45 | 45 | 45 | 45 | 30 | 60 |
| Stearic acid | | 3 | 3 | 3 | 3 | 3 | 3 | 3 |
| Anti-oxidant 4010NA | | 2 | 2 | 2 | 2 | 2 | 2 | 2 |
| ZnO | | 5 | 5 | 5 | 5 | 5 | 5 | 5 |
| Vulcanization accelerator CZ | | 0.6 | 0.6 | 0.6 | 0.6 | 0.6 | 0.6 | 0.6 |
| Sulfur | | 2 | 2 | 2 | 2 | 2 | 2 | 2 |
| Characteristics in carbon black | $N_2SA$ (m$^2$/g) | 107 | 125 | 126 | 125 | 125 | 125 | 125 |
| | IA (mg/g) | 94 | 113 | 115 | 113 | 113 | 113 | 113 |
| | $N_2SA$/IA ratio | 1.13 | 1.11 | 1.10 | 1.11 | 1.11 | 1.11 | 1.11 |
| | DBP (ml/100 g) | 116 | 117 | 126 | 117 | 117 | 117 | 117 |
| | 24M4DBP (ml/100 g) | 105 | 107 | 112 | 107 | 107 | 107 | 107 |
| | ΔDBP | 11 | 10 | 14 | 10 | 10 | 10 | 10 |
| Characteristics in rubber | Hardness Hd | 60 | 63 | 68 | 59 | 56 | 54 | 71 |
| | Resilience (%) | 69 | 68 | 69 | 67 | 67 | 78 | 53 |
| | Wear resilience | 92 | 109 | measurement impossible | 108 | 102 | — | — |

*1N-220,
*2N-299,
*3N-110,
*4N-242

As evident from Table 1, the rubber compositions according to the present invention shown in Examples are in high level with respect to wear resistance and resilience which is necessary for obtaining the fuel saving.

FIG. 1 is a graph plotting the wear resistance indexes and the fuel saving (resilience, %) with respect to the Samples Nos. 1 to 9, 11, and 12.

In FIG. 1, it is seen that the rubber compositions in Examples 9 and 11 of the present invention retain high test was considered to be dangerous. Since the resilience of the Sample No. 14 was too low and the fuel saving thereof did not meet the object of the present invention, no actual car wear resistance test was performed.

(Effects of the present invention)

As have been described in the above, the rubber composition according to the present invention is excellent in the wear resistance and at the same time in the low fuel consumption due to the compounding of a specified amount of carbon black satisfying the characteristics (A) to (D) mentioned above, and therefore the invention shows extremely large effects when used in the tread rubber for tires, particularly, tires for large scaled vehicles.

What is claimed is:

1. A rubber composition characterized in that with respect to 100 parts of natural rubber alone or a blend rubber consisting of natural rubber and not more than 50% by weight of at least one kind of a diene base synthetic rubber, carbon black having the following properties is blended in an amount from 35 to 55 parts by weight:

(a) A nitrogen adsorption specific surface area ($N_2SA$) of from 115 to 135 $m^2/g$,
(b) A strength ($\Delta DBP$) of the agglomerates defined by the following formula of not more than 18 ml/100 g, $$\Delta DBP (\text{ml}/100 \text{ g}) = DBP - 24M4DBP$$

(c) An oil absorption at 24M4DBP of from 95 to 110 ml/100 g,
(d) A ratio of the nitrogen adsorbing specific surface area ($N_2SA$) ($m^2/g$) to the iodine adsorbing specific surface area (IA) (mg/g) of from 1.05 to 1.20, wherein said composition has a rubber hardness of 55 to 67.

* * * * *